M. S. HECKATHORN.
SAW CLAMP.
APPLICATION FILED OCT. 10, 1916.
1,220,108.
Patented Mar. 20, 1917.
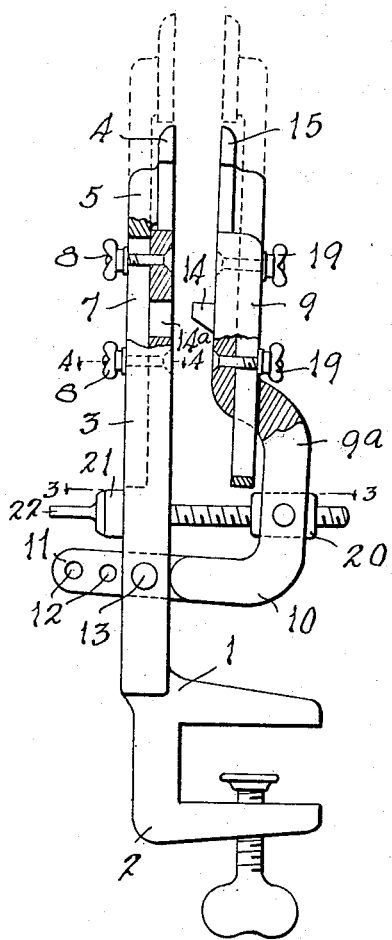
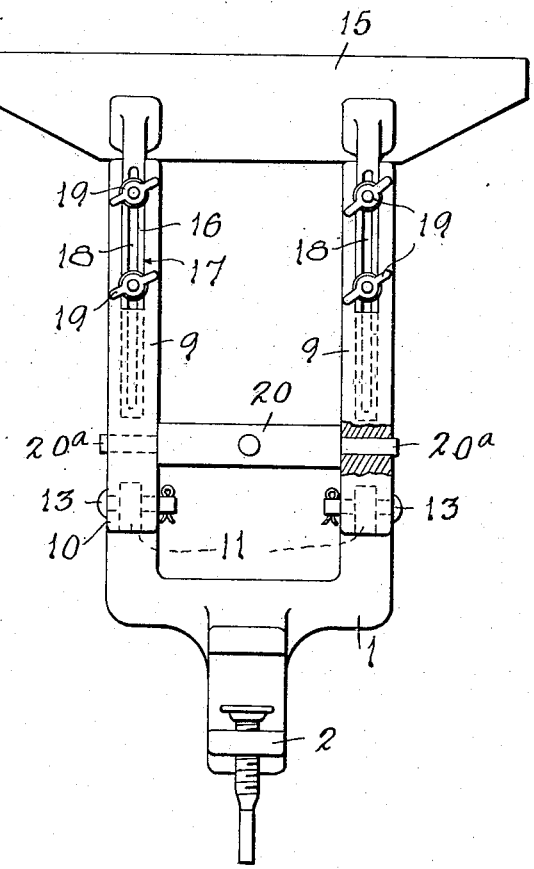
Inventor
M. S. HECKATHORN
N. S. I————
Attorney

UNITED STATES PATENT OFFICE.

MICHAEL S. HECKATHORN, OF TEN MILE BOTTOM, PENNSYLVANIA.

SAW-CLAMP.

1,220,108.  Specification of Letters Patent.  Patented Mar. 20, 1917.

Application filed October 10, 1916. Serial No. 124,794.

*To all whom it may concern:*

Be it known that I, MICHAEL S. HECKATHORN, a citizen of the United States, residing at Ten Mile Bottom, in the county of Venango, State of Pennsylvania, have invented a new and useful Saw-Clamp; and I do hereby declare the following to be a full, clear, and exact description of the invention, such as will enable others skilled in the art to which it appertains to make and use the same.

The present invention relates to a saw clamp, and has for its object to provide a device of this character which embodies novel features of construction whereby the saw blade can be tightly clamped and securely held in the most advantageous position for sharpening.

Further objects of the invention are to provide a saw clamp which is comparatively simple and inexpensive in its construction, which can be readily mounted in position or removed therefrom, which admits of the jaws being adjusted to grip the saw in the most advantageous manner, and which can be easily manipulated.

With these and other objects in view, the invention consists in certain novel combinations and arrangements of the parts as will more fully appear as the description proceeds, the novel feature thereof being pointed out in the appended claims.

For a full understanding of the invention, reference is to be had to the following description and accompanying drawing in which:—

Figure 1 is a side elevation of a saw clamp constructed in accordance with the invention, the jaws being shown by dotted lines in an adjusted position, and parts being broken away and shown in section to illustrate more clearly certain details of construction.

Fig. 2 is a front elevation of the clamp.

Fig. 3 is a horizontal sectional view on the line 3—3 of Fig. 1.

Fig. 4 is an enlarged horizontal sectional view on the line 4—4 of Fig. 1.

Corresponding and like parts are referred to in the following description and indicated in all the views of the drawings by the same reference characters.

Specifically describing the present embodiment of the invention, the numeral 1 designates a base which is provided with a conventional clamp 2 for attaching the device to the edge of a table or like supporting member. A pair of fixed uprights 3 extend upwardly from the base 1 in a spaced and parallel relation and carry the fixed clamping jaw 4. This jaw 4 is preferably adjustable, being shown as provided with slides 5 which operate in grooves 6 in the standards 3, said slides being slotted at 7 to receive the set screws 8. This construction admits of the jaw 4 being moved up and down and rigidly clamped in an adjusted position by means of the set screws.

A swinging lever 9 is arranged upon one side of each of the standards 3, the lower ends of the swinging levers being offset outwardly at $9^a$ and terminating in inwardly extending arms 10 which are pivotally connected to the respective standards 3. In the present instance it will be noted that the arms 10 are provided at their extremities with pivot ears 11 which pass loosely through openings in the standards 3, each of the pivot ears being provided with a series of openings 12, any selected one of which can be engaged by a pivot pin 13. This admits of the clamp being adjusted for use in connection with thicker articles than a saw blade, if desired.

The swinging levers 9 may each be provided with a saw rest 14 to engage the back of the saw blade preparatory to tightening the clamp, and the standards 3 are provided with clearance openings $14^a$ to receive the saw rests 14 when the jaws of the clamp are forced together. The movable jaw 15 is carried by the swinging arms 9, being provided with slides 16 which operate in grooves 17 in the swinging levers, and are slotted at 18 to receive the set screws 19. This admits of the movable jaw 15 being adjusted in a manner corresponding to the fixed jaw 4, and it will be obvious that the two jaws may be adjusted with relation to the saw rest 14 so as to grip the saw blade in the most advantageous manner when sharpening the same.

The offset portions $9^a$ of the two swinging levers 9 are connected by a cross bar 20, and in a similar manner a cross bar 21 connects the two standards 3, a clamping screw 22 being swiveled upon the cross bar 21 and having a threaded engagement with the cross bar 20, so that by tightening the clamping screw the two jaws can be forced toward each other and caused to grip any object such as a saw blade which may be placed between the same. The cross bar 20 is preferably provided at its ends with trunnions 20ª which pivotally engage the offset portions 9ª of the levers 9, thereby enabling the cross bar to turn about its longitudinal axis in such a manner as to prevent binding of the clamping screw when the jaws are opened.

Having thus described the invention, what I claim as new and desire to secure by Letters Patent, is:—

1. A saw clamp including a base, a fixed upright, a fixed jaw carried by the upright and adjustable longitudinally thereof, a swinging lever on one side of the upright, a movable jaw carried by the swinging lever and adjustable longitudinally thereon, the lower end of the lever being offset outwardly and terminating in an inwardly extending arm which is pivotally connected to the upright, a saw rest carried by one of the members of the clamp, and clamping means for moving the swinging lever toward and away from the upright.

2. A saw clamp including a base, a grooved upright projecting from the base, a fixed jaw carried by the upright, a slide secured to the fixed jaw and adjustably received within the groove of the upright, clamping means engaging the slide to lock the fixed jaw in an adjusted position, a grooved swinging lever on one side of the upright, a movable jaw carried by the lever, a slide secured to the movable jaw and adjustable within the groove of the lever, clamping means for locking the slide in an adjusted position, the lower end of the lever being pivotally connected to the upright, and means for swinging the lever toward and away from the upright.

3. A saw clamp including a base, a pair of spaced and parallel standards projecting from the base, a transversely disposed fixed jaw carried by the uprights at the upper ends thereof, a swinging lever on one side of each upright, a transversely disposed movable jaw carried by the swinging levers at the upper ends thereof, the lower ends of the swinging levers being offset outwardly and terminating in inwardly extending arms which are pivotally connected to the respective uprights, a cross piece connecting the outwardly offset lower ends of the levers, a cross piece connecting the uprights, and a clamping screw operatively connecting the cross pieces for moving the swinging levers toward and away from the uprights.

4. A saw clamp including a base, a pair of spaced and parallel uprights projecting therefrom and having transverse openings therein, a transversely disposed fixed jaw carried by the uprights at the upper ends thereof, a swinging lever on one side of each of the uprights, a transversely disposed movable jaw carried by the swinging levers at the upper ends thereof, the lower ends of the swinging levers being offset outwardly and terminating in inwardly extending arms, pivot ears projecting from the extremities of the inwardly extending arms and passing loosely through the transverse openings of the uprights, said pivot ears being each provided with a series of openings, removable pivot ears upon the uprights for engaging any selected set of said openings, a cross piece connecting the outwardly offset lower ends of the levers, a corresponding cross piece connecting the uprights, and a clamping screw operatively connecting the cross pieces for swinging the levers toward and away from the uprights.

5. A saw clamp including a base, a pair of spaced and parallel uprights projecting therefrom and provided with longitudinal grooves, a transversely extending fixed jaw carried by the uprights, slides secured to the fixed jaws and adjustable within the grooves of the uprights, means for clamping the slides in an adjusted position, a swinging lever on one side of each of the uprights, said swinging levers being longitudinally grooved and the lower ends of the levers being offset outwardly and terminating in inwardly extending arms which are pivotally connected to the respective uprights, a transversely disposed movable jaw carried by the swinging levers, slides secured to the movable jaw and adjustable within the grooves of the levers, means for locking the slides in an adjusted position, a cross piece connecting the outwardly offset lower ends of the levers, a corresponding cross piece connecting the uprights, and a clamping screw operatively connecting the two cross pieces.

In testimony whereof I have signed my name to this specification in the presence of two subscribing witnesses.

MICHAEL S. HECKATHORN.

Witnesses:
ARTHUR S. HOOKINS,
ARNOLD HECKATHORN.

Copies of this patent may be obtained for five cents each, by addressing the "Commissioner of Patents, Washington, D. C."